(12) United States Patent
Chong

(10) Patent No.: US 6,481,678 B1
(45) Date of Patent: Nov. 19, 2002

(54) ELECTRICAL HOUSING FOR MODULAR OFFICE FURNITURE

(75) Inventor: Jonathan Chee Yeen Chong, Chicago, IL (US)

(73) Assignee: The Marvel Group, Inc., Chicago, IL (US)

( * ) Notice: Subject to any disclaimer, the term of this patent is extended or adjusted under 35 U.S.C. 154(b) by 0 days.

(21) Appl. No.: 09/398,220

(22) Filed: Sep. 17, 1999

Related U.S. Application Data

(60) Provisional application No. 60/117,770, filed on Jan. 29, 1999.

(51) Int. Cl.⁷ .................................................. E04G 5/06
(52) U.S. Cl. .............................. 248/220.42; 211/94.01; 211/192
(58) Field of Search ....................... 248/220.42, 220.43, 248/220.22, 221.11, 225.51, 223.41, 224.7–224.8, 225.11, 225.21, 241–243, 297.21, 220.31; 211/191–192, 94.01

(56) References Cited

U.S. PATENT DOCUMENTS

| | | | | |
|---|---|---|---|---|
| 1,962,396 A | * | 6/1934 | Katz et al. | |
| 2,080,261 A | * | 5/1937 | Funk | |
| 2,127,280 A | | 8/1938 | Zimbalist | |
| 2,534,952 A | | 2/1950 | Comer | |
| 2,587,912 A | * | 3/1952 | Simpson | |
| 2,742,252 A | * | 4/1956 | Wiesener | 248/224 |
| 2,956,688 A | | 10/1960 | Galassi | |
| 3,294,351 A | * | 12/1966 | Rollins, Jr. | 248/243 |
| 3,353,684 A | | 11/1967 | Chesley | |
| 3,601,432 A | | 8/1971 | Fenwick | 248/222.13 |
| 3,636,342 A | * | 1/1972 | Blount | 248/221.21 |
| 3,666,303 A | | 5/1972 | Huls | 108/108 |
| 3,730,108 A | | 5/1973 | Stroh | 108/108 |
| 3,794,281 A | | 2/1974 | Munsey | |
| 3,888,440 A | * | 6/1975 | Rebentisch | 248/223 |
| 3,966,158 A | * | 6/1976 | Boundy | 248/243 |
| 4,133,433 A | | 1/1979 | Wolf | 211/192 |
| 4,154,419 A | * | 5/1979 | Breidenbach | 248/243 |
| 4,171,789 A | | 10/1979 | Vander Hoek et al. | |
| 4,198,913 A | | 4/1980 | Haworth et al. | |
| 4,303,217 A | * | 12/1981 | Garfinkle | 248/221.11 |
| 4,401,222 A | * | 8/1983 | Kulikowski et al. | 211/94.01 |
| 4,406,374 A | * | 9/1983 | Yedor | 211/192 |
| 4,446,451 A | * | 5/1984 | Boulanger | |
| 4,592,286 A | * | 6/1986 | Trubiano | 211/287 |
| 4,615,503 A | * | 10/1986 | Garfinkle | 248/224.4 |
| 4,678,151 A | * | 7/1987 | Radek | 248/220.2 |
| 4,697,774 A | * | 10/1987 | Sarton et al. | 248/221.4 |
| D311,858 S | * | 11/1990 | Richmond | 248/243 X |
| 4,971,281 A | | 11/1990 | Steinbeck | |
| 5,025,937 A | * | 6/1991 | King | 211/192 |
| 5,116,007 A | | 5/1992 | Von Gunton et al. | |
| 5,433,327 A | | 7/1995 | Benvenuti et al. | 211/193 |
| 5,456,435 A | * | 10/1995 | Sweeney | 248/250 |
| 5,494,246 A | | 2/1996 | McCarthy et al. | 211/192 |
| 5,538,213 A | | 7/1996 | Brown | |
| 6,003,685 A | * | 12/1999 | Malin | 248/220.42 |
| 6,015,124 A | * | 1/2000 | Loy | 248/220.31 |
| 6,042,203 A | * | 3/2000 | Bogucki | 248/242 |
| 6,105,794 A | * | 8/2000 | Bauer | 211/94.01 |

* cited by examiner

Primary Examiner—Daniel P. Stodola
Assistant Examiner—Jennifer E. Novosad
(74) Attorney, Agent, or Firm—Edgar A. Zarins; Lloyd D. Doigan

(57) ABSTRACT

A modular office system incorporating a housing bracket for retaining wiring running through the office system. The bracket includes a pair of cooperating housing members adapted to be secured to a support member of the furniture. The housing members are joined to form a passageway through which the wires are run. The housing bracket is detachably connected to the support for simple relocation. Hooks on each of the housing members are received in corresponding slots of the support member. The housing members are joined by a fastener to form the wire passageway. A mounting plate secured to the bracket can be used to mount accessories such as power strips within the modular furniture assembly.

8 Claims, 2 Drawing Sheets

ELECTRICAL HOUSING FOR MODULAR OFFICE FURNITURE

RELATED APPLICATIONS

This application claims priority from U.S. Provisional Application No. 60/117,770 filed Jan. 29, 1999.

BACKGROUND OF THE INVENTION

I. Field of the Invention

This invention relates to modular office furniture and, in particular, to a bracket for maintaining utility wires and a power strip along a frame member of the furniture assembly.

II. Description of the Prior Art

Modular office systems have become increasingly popular for their ease of installation and relatively low cost in association with the flexibility such systems provide. Office cubicles, desks and partitions can be easily rearranged or disassembled as personnel requirements change. However, these office systems must also be stable enough to withstand continuous use while also being capable of delivering essential utilities such as electrical power, telephones and computer networking. Because of the modular construction of such office systems supplying such utilities must be conveniently accomplished. It is also desirable to organize the utility wiring throughout the modular system to facilitate repair or replacement.

Prior known office systems are very rigid in their construction variations. Typically, a frame is provided to which appropriate panels, drawers and desktops are mounted. Wiring may be run through the frame or between panels. However, such prior known systems do not provide an opportunity to alter the system configuration using the same components. Additionally, it is desirable to attach remote power strips and run utility wiring through the furniture to provide telephone, electrical and computer networks. However, these wires can form an unmanageable highway of wiring.

SUMMARY OF THE PRESENT INVENTION

The present invention overcomes the disadvantages of the prior known modular office systems by providing a bracket detachably mountable to frame members for securing an electrical power strip and organizing the utility wires running through the furniture system.

The present invention comprises a bracket which is readily mountable to a frame member of the office furniture system to guide wiring yet is detachable for relocation. The bracket includes a pair of cooperating bracket members each having hooks adapted to be received within corresponding slots of the frame member to form a passageway for the wires. Upon insertion of the hooks into the slots, both housings are moved toward each other into mating engagement to form the complete bracket passageway. The bracket halves include apertures adapted to receive a fastener for securing the bracket halves together preventing their separation.

A mounting plate is secured to the brackets using the fastener. The mounting plate can be used to receive a power strip at a desired location within the modular furniture assembly. The power strip simply detachably engages the plate, specifically the lateral flanges. In alternative assembly, the mounting plate is used to positionally capture a switch cover housing which slidably receives a power strip.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters to like parts throughout the views and in which.

DETAILED DESCRIPTION OF A PREFERRED EMBODIMENT OF THE PRESENT INVENTION

Figure 1:
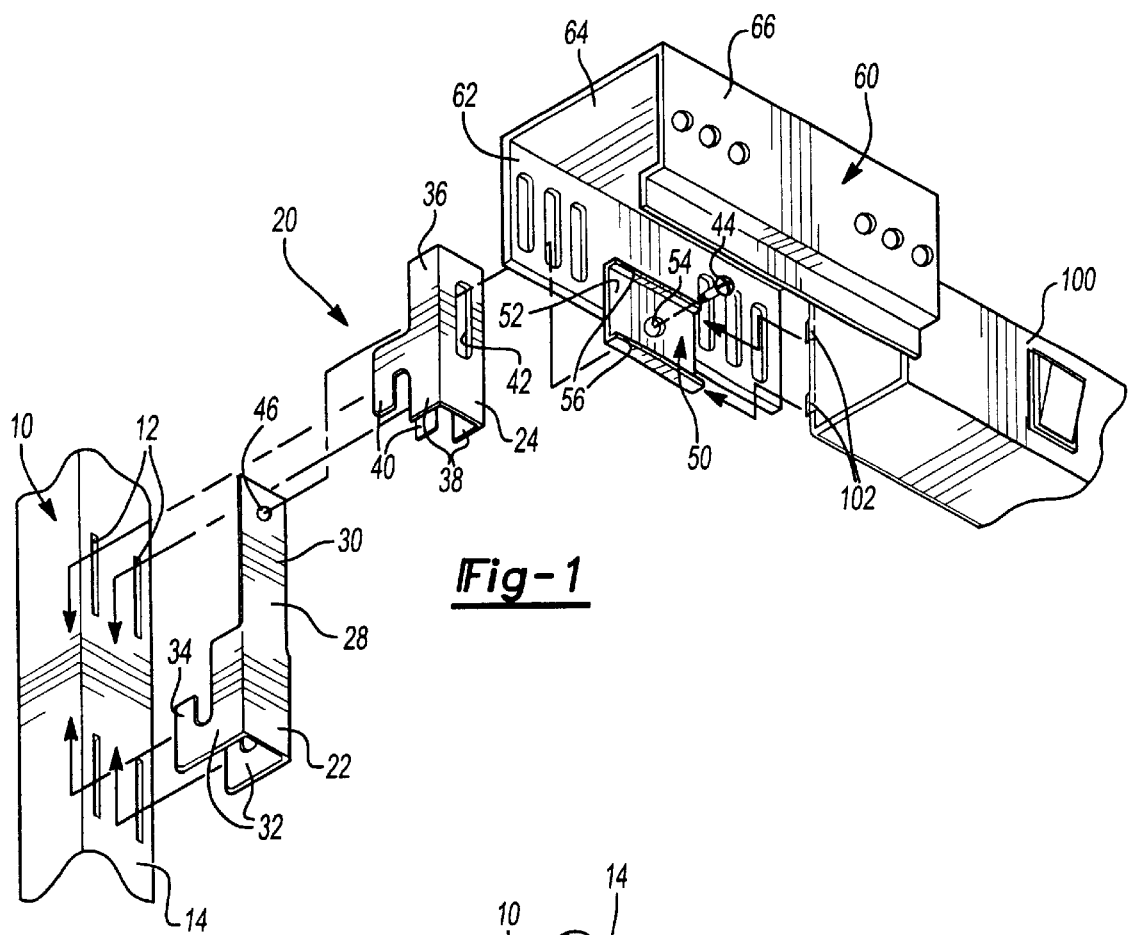
FIG. 1 is an exploded perspective view of the housing bracket assembly embodying the present invention.
Figure 2:
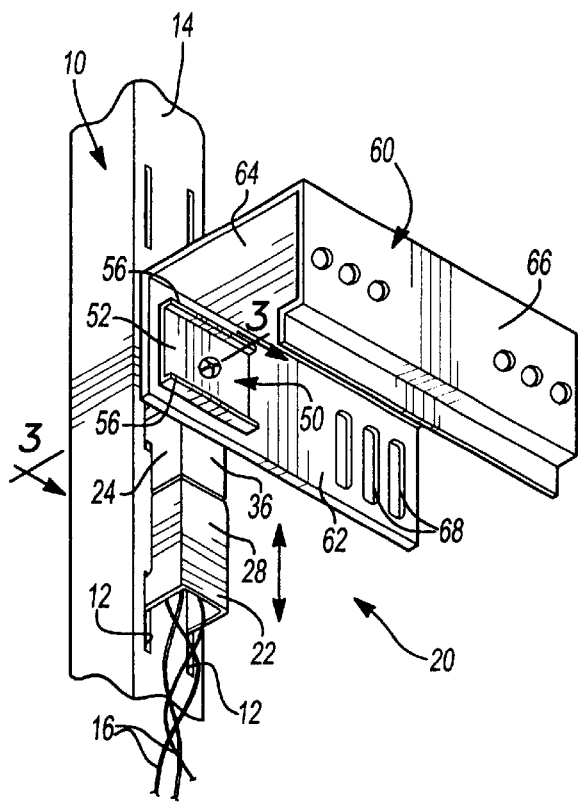
FIG. 2 is a perspective view of the housing bracket mounted to a frame member of the furniture system.
Figure 3:
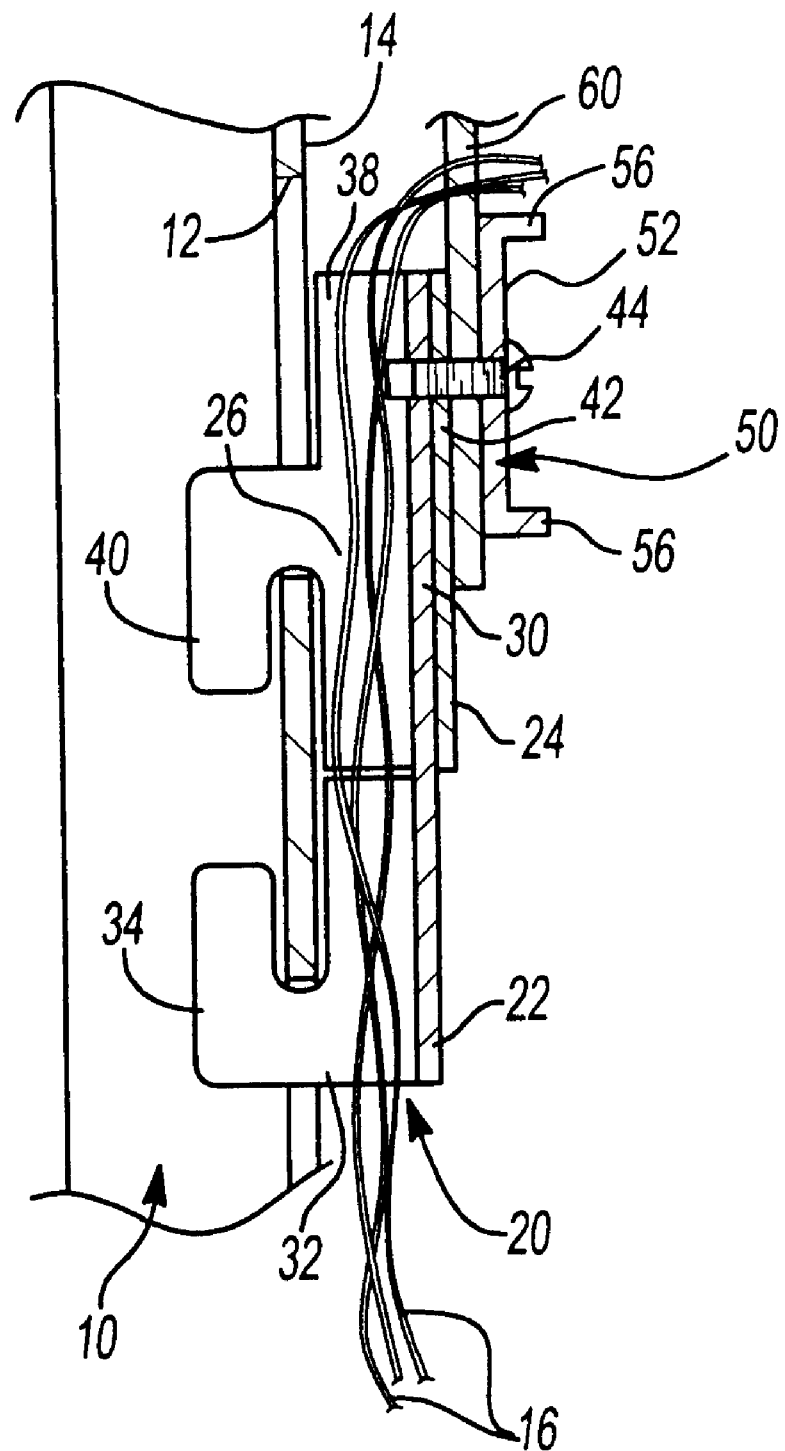
FIG. 3 is a cross-sectional view of the housing bracket mounted to the modular furniture.

Referring to FIGS. 1 through 3 of the drawing, there is shown a frame member 10 of a modular office furniture system. The frame member 10 may form an upright support or a cross member for constructing the furniture such as partitions, cubicles, desks and storage units. The frame member 10 preferably has a tubular configuration with a plurality of slots 12 formed through a wall 14 thereof for attaching modular components of the office system. In a preferred embodiment, the wall 14 has pairs of slots 12 spaced along the length of the frame member 10. A plurality of frame members 10 are assembled to form the rectangular frame of the modular furniture. Thereafter, panels, desktops and similar planar components can be mounted to the frame members.

Detachably mounted to the frame member 10 is a bracket housing 20 for retaining and guiding one or more wires 16 throughout the office system. The wires 16 may include wiring for telephone, electrical and computer networks and the bracket 20 provides a means for organizing and harnessing the wires throughout the system. The bracket 20 includes a pair of housing members 22 and 24 matingly connected to form a passageway 26 for the wires 16. The male housing member 22 has a planar face plate 28 with an extension 30. Side walls 32 are formed perpendicular to the face plate 28 and include hooks 34 extending therefrom. The hooks 34 are spaced apart corresponding to the separation of the slots 12 in the frame member 10.

The female housing member 24 similarly includes a facing 36 with a pair of spaced apart side walls 38. Extending from the side walls 38 are hooks 40 adapted to be received within the slots 12 of the frame member 10. The facing 36 preferably includes an elongated opening 42 for receiving a fastener 44. The fastener is threadably received within an aperture 46 of the male housing member 22 and selectively travels within the elongated opening 42 to facilitate telescoping movement of the housing members 22 and 24.

The bracket housing 20 is assembled by inserting the male member 22 into the female member 24 until such that the aperture 46 is aligned with the elongated opening 42. The fastener 44 is inserted through the opening 42 into the aperture 46 but not fully tightened to allow telescoping adjustment of the bracket 20. With the bracket 20 expanded, the wires 16 are gathered and positioned within the housing 20. The hooks 34 and 40 are placed through the slots 12 and the housing 20 is contracted such that the hooks 34 and 40 extend behind the wall 14 of the frame member 10 as best shown in FIG. 3. Once the fastener 44 is tightened, the bracket 20 is secured to the frame member 10 forming a passageway 50 in conjunction with the wall 14 of the frame member 10 through which the wires 16 may be run. The bracket 20 can be preassambled to the frame 10 through which the wires 16 may be run and then grouped within the bracket 20 for securement within the office system. Similarly, the bracket 20 is detachable for adding or removing specific wires 16.

The bracket housing 20 can also be used to mount a power strip 100 or other utility device in a convenient location within the furniture assembly. A mounting plate 50 can be secured to the bracket 20 using the fastener 44. The mounting plate 50 has a rear wall 52 with an aperture 54 to receive the fastener 44. A pair of parallel lateral flanges 56 extend outwardly perpendicular to the rear wall 52. These flanges 56 are adapted to cooperate with mating flanges 102 or similar structure on the power strip 100 to connect the power strip 100 to the bracket housing 20.

In an alternative embodiment, a switch cover housing 60 may be secured to the bracket 20 to enclose or house the power strip 100. The housing 60 preferably includes a rear wall 62, a top wall 64 and a front wall 66. The rear wall 62 is provided with a plurality of openings 68 through which the fastener 44 may pass. Upon mounting of the plate 50, the rear wall 62 is captured against the face of the bracket housing 20 and the plate 50 receives the power strip 100 to be housed within the cover 60. In this manner, the power strip 100 or any alternative components may be conveniently positioned within the modular furniture and, if necessary, re-positioned.

The foregoing detailed description has been given for clearness of understanding only and no unnecessary limitations should be understood therefrom as some modifications will be obvious to those skilled in the art.

What is claimed is:

1. A retaining bracket adapted to be removably mounted to a frame member of an office system, said retaining bracket comprising:

a first bracket having a housing adapted to cooperate with the frame member to form a first passageway, said first bracket including a pair of legs oriented in a first direction adapted to be received in corresponding slots of the frame member, whereby said first passageway extends substantially between said pair of legs of said first bracket;

a second bracket having a housing adapted to cooperate with the frame member to form a second passageway, said second bracket including an extension matingly received within said first bracket and a pair of legs oriented in a second direction adapted to be received in corresponding slots of the frame member, whereby said second passageway extends substantially between said pair of legs of said second bracket;

means for fastening said first and second brackets such that said extension is matingly disposed within said first bracket and said legs of said first and second brackets are opposingly oriented to prevent separation and maintain said bracket on the frame member; and said first and second passageways of said brackets align forming a passageway through said retaining brackets for retaining components of the office system.

2. The retaining bracket as defined in claim 1 wherein said first bracket and said extension of said second bracket include openings for receiving said fastening means.

3. The retaining bracket as defined in claim 2 wherein said opening in said first bracket is an elongated slot to facilitate sliding adjustment of said first bracket relative to said second bracket.

4. The retaining bracket as defined in claim 1 and further comprising a mounting plate detachably secured to said first and second brackets.

5. The retaining bracket as defined in claim 4 wherein said mounting plate is mounted to said first and second brackets by said fastening means.

6. The retaining bracket as defined in claim 4 wherein said mounting plate secures a switch housing to said first and second brackets, said switch housing positionally captured between said mounting plate and said first and second brackets.

7. The retaining bracket as defined in claim 4 wherein said mounting plate includes a pair of parallel lateral flanges.

8. A retaining bracket adapted to be removably mounted to a frame member of an office system, the frame member having a plurality of parallel slots and the office system having at least one utility wire, said retaining bracket comprising:

a first bracket having a housing adapted to cooperate with the frame member to form a first passageway, said first bracket including a pair of parallel legs having hooks oriented in a first direction adapted to be received in a pair of slots of the frame member whereby said first passageway extends substantially between said parallel legs of said first bracket;

a second bracket having a housing adapted to cooperate with the frame member to form a second passageway, said second bracket including an extension matingly received within said first bracket and a pair of parallel legs having hooks oriented in a second direction opposing said first hooks and adapted to be received in a pair of slots of the frame member whereby said second passageway extends substantially between said parallel legs of said second bracket; and means for fastening said first and second brackets such that said extension is matingly disposed within said first bracket and said hooks of said first and second brackets are opposingly oriented to prevent separation and maintaining said bracket on the frame member, said first and second passageways of said brackets forming a continuous passageway adapted to receive the at least one utility wire extending therethrough, said fastening means securing a switch housing to said first and second bracket and the frame member.

\* \* \* \* \*